(12) United States Patent
Ahnfalk

(10) Patent No.: US 11,498,533 B2
(45) Date of Patent: Nov. 15, 2022

(54) CONTROL OF ACTIVATION THRESHOLD FOR VEHICLE SAFETY SYSTEMS

(71) Applicant: Zenuity AB, Gothenburg (SE)

(72) Inventor: Sten Henrik Ahnfalk, Kungsbacka (SE)

(73) Assignee: Zenuity AB, Gothenburg (SE)

( * ) Notice: Subject to any disclaimer, the term of this patent is extended or adjusted under 35 U.S.C. 154(b) by 366 days.

(21) Appl. No.: 16/782,188

(22) Filed: Feb. 5, 2020

(65) Prior Publication Data

US 2020/0247369 A1 Aug. 6, 2020

(30) Foreign Application Priority Data

Feb. 6, 2019 (EP) ..................................... 19155774

(51) Int. Cl.
*B60T 7/12* (2006.01)
*H04W 4/40* (2018.01)
(Continued)

(52) U.S. Cl.
CPC ............... *B60T 7/12* (2013.01); *H04W 4/025* (2013.01); *H04W 4/40* (2018.02); *B60T 2210/32* (2013.01); *B60T 2220/04* (2013.01); *G01S 19/51* (2013.01)

(58) Field of Classification Search
CPC ... B60W 2050/0062; B60W 2050/048; B60W 50/0098; B60W 50/085; B60W 2556/50; B60W 2556/55; B60W 2556/60; B60W 2556/65; B60W 2420/52; B60W 30/09; B60W 2510/182; B60W 2554/801; B60W 2710/182; B60W 2420/42; B60T 7/12; B60T 2210/32; B60T 2220/04; H04W 4/025; H04W 4/40; G01S 19/51
(Continued)

(56) References Cited

U.S. PATENT DOCUMENTS 6,637,839 B1 10/2003 Fuchs et al.
9,922,554 B2 * 3/2018 Mikuni ................ G08G 1/0137
(Continued)

FOREIGN PATENT DOCUMENTS

DE 102016209556 A1 12/2017
EP 2915718 A1 9/2015
(Continued)

OTHER PUBLICATIONS

Extended European Search Report dated Jul. 3, 2019 for European Application No. 19155774, 8 pages.

*Primary Examiner* — Atul Trivedi
(74) *Attorney, Agent, or Firm* — Sage Patent Group

(57) ABSTRACT

There is presented a method for controlling an activation threshold of a safety system of a vehicle. The method comprises receiving map data from a remote data repository, said map data comprising a geographical location of a dynamic object located in a surrounding area of an expected path of the vehicle, determining a geographical location of the vehicle by means of a localization system of the vehicle, and lowering an activation threshold value of the safety system when the geographical location of the vehicle is within a predefined distance from the dynamic object. The presented method provides for an efficient means for preparing e.g. an emergency brake assist system of a vehicle in potentially critical situations.

11 Claims, 4 Drawing Sheets

(51) Int. Cl.
*H04W 4/02* (2018.01)
*G01S 19/51* (2010.01)
(58) Field of Classification Search
USPC .......................................................... 701/70
See application file for complete search history.

(56) References Cited

U.S. PATENT DOCUMENTS

| | | | |
|---|---|---|---|
| 2013/0145360 A1* | 6/2013 | Ricci | H04W 4/48 |
| | | | 717/174 |
| 2014/0067220 A1 | 3/2014 | Seiler | |
| 2014/0109080 A1* | 4/2014 | Ricci | G06F 8/61 |
| | | | 717/174 |
| 2015/0019080 A1 | 1/2015 | Scheinder | |
| 2015/0104757 A1* | 4/2015 | Moncrief | G09B 9/05 |
| | | | 434/30 |
| 2015/0187224 A1* | 7/2015 | Moncrief | G09B 9/052 |
| | | | 434/30 |
| 2017/0166222 A1* | 6/2017 | James | G05D 1/0088 |
| 2018/0004215 A1* | 1/2018 | Miller | G01C 21/3461 |
| 2018/0050673 A1* | 2/2018 | D'sa | B60T 7/042 |
| 2018/0053419 A1* | 2/2018 | Kiefer | H04W 4/44 |
| 2018/0061237 A1* | 3/2018 | Erickson | G08G 1/0112 |
| 2018/0079422 A1* | 3/2018 | Weinstein-Raun | G08G 1/202 |
| 2018/0217603 A1* | 8/2018 | Kwon | H04L 67/12 |
| 2018/0362028 A1* | 12/2018 | Prokhorov | B60W 60/0011 |
| 2019/0086935 A1* | 3/2019 | Switkes | G08G 1/22 |

FOREIGN PATENT DOCUMENTS

| | | | | |
|---|---|---|---|---|
| GB | 2551147 A | * | 12/2017 | ............ B60W 40/04 |
| JP | 2005104451 A | * | 4/2005 | |

* cited by examiner

CONTROL OF ACTIVATION THRESHOLD FOR VEHICLE SAFETY SYSTEMS

CROSS-REFERENCE TO RELATED APPLICATIONS

The present application for patent claims priority to European Patent Office Application Ser. No. 19155774.3, entitled "CONTROL OF ACTIVATION THRESHOLD FOR VEHICLE SAFETY SYSTEMS" filed on Feb. 6, 2019, assigned to the assignee hereof, and expressly incorporated herein by reference.

TECHNICAL FIELD OF THE INVENTION

The present invention relates to methods and systems for controlling activation thresholds of vehicle safety systems, such as emergency brake assist systems.

BACKGROUND

Today, many vehicles have a variety of driver support functions in the form of advanced driver assistance systems (ADAS). Also, many of these support function form a basis for current and future autonomous drive (AD) functions. Examples of ADAS features or functions include lane departure warning systems, lane change assistance, parking sensors, pedestrian protection systems, blind spot monitors, adaptive cruise control (ACC), anti-lock braking systems, and so forth. These functions supplement the traditional driver control of the vehicle with one or more warnings or automated actions in response to certain scenarios.

Furthermore, some of these features may be labelled as vehicle safety systems whose purpose is mainly related to increasing passenger safety by reducing the risk of accidents as well as the severity of accidents.

One such example is emergency brake assist (EBA) systems, which provide for carrying out an automated emergency braking when a driver-controlled use of brakes is considered to be too poor. Some EBA systems are triggered by detecting a speed with which the brake pedal is depressed, alternatively one can take into account the rapidity of which the accelerator pedal is released. In more detail, many drivers are not prepared for the relatively high efforts required to achieve maximum braking, nor are they prepared for the "buzzing" feedback through the brake pedal during ABS operation. Thus, if an emergency develops, a slow reaction and less than maximum braking input could result in insufficient time or distance to stop before an accident occurs. The EBA system is designed to detect such behaviour and overrides and fully applies the brakes.

However, the continuous development of ADAS and AD features and functions are important factors not only in terms of increasing road safety, but also in terms of reducing the cognitive burden for vehicle users and improving the overall user experience in vehicles.

SUMMARY OF THE INVENTION

It is therefore an object of the present invention to provide a method for controlling an activation threshold of a safety system of a vehicle, a non-transitory computer-readable storage medium, a vehicle control system, a vehicle, and a vehicle management system, which alleviate all or at least some of the drawbacks of presently known systems.

This object is achieved by means of a method a non-transitory computer-readable storage medium, a vehicle control system, a vehicle, and a vehicle management system, as defined in the appended claims. The term exemplary is in the present context to be understood as serving as an instance, example or illustration.

According to a first aspect of the present invention, there is provided a method for controlling an activation threshold of a safety system of a vehicle. The method comprises receiving map data from a remote data repository, the map data comprising a geographical location of a dynamic object located in a surrounding environment (may also be referred to as surrounding area) of an expected path of the vehicle, and determining a geographical location of the vehicle by means of a localization system of the vehicle. The method further comprises lowering an activation threshold value of the safety system when the geographical location of the vehicle is within a predefined distance from the dynamic object. The presented method provides for an efficient means for preparing e.g. an emergency brake assist system of a vehicle in potentially critical situations.

The present invention is at least partly based on the realization that real-time map data can be used as an additional "sensor input" in order to detect whether or not the vehicle is located in a potentially critical situation. Thus, instead of just relying on the ego-vehicle's perception system and associated sensor data, or determining from static map data that the ego-vehicle is located in some general critical area, the proposed method utilizes other vehicles' sensor data to adequately prepare one or more safety systems of the vehicle in order to mitigate collision risks. Particularly, on small and windy country roads where visibility may be poor (high number of corners and elevations).

The predefined distance may for example be within a 500 m radius of the last known geographical location of the dynamic object. However, the predefined distance may also be dynamically determined based on the type of dynamic object. For example, a cyclist may be associated with a larger predefined distance than a pedestrian. This is because a cyclist can be assumed to move at a faster speed wherefore an increase of the predefined distance (safety radius) can account for the greater movement speed.

Further, according to an exemplary embodiment, the dynamic object is a first dynamic object the method further comprises determining a position, relative to the vehicle, of the second dynamic object in a surrounding environment of the vehicle, determining a geographical location of the second dynamic object in the surrounding environment of the vehicle based on the determined position of the second dynamic object and the determined geographical location of the vehicle, and transmitting wireless data packets comprising information about the geographical location of the second dynamic object to the remote data repository. Thus, the ego-vehicle can also be utilized as part of a network of map data providers. Moreover, this allows the map data to be continuously updated of the movement of the dynamic object(s), further increasing the accuracy of the method.

Still further, in accordance with another exemplary embodiment the method comprises raising the activation threshold of the safety system when the geographical location of the vehicle changes from being within the predefined distance to being outside of the predefined distance from the first dynamic object. In other words, when the vehicle is not in a surrounding area of a known dynamic object, the safety system is set to have a standard threshold value.

Yet further, according to a second aspect of the present invention, there is provided a non-transitory computer-readable storage medium storing one or more programs configured to be executed by one or more processors of a vehicle control system, the one or more programs comprising instructions for performing the method according to any one of the preceding claims. With this aspect of the invention, similar advantages and preferred features are present as in the previously discussed first aspect of the invention.

Moving on, according to a third aspect of the present invention, there is provided a vehicle control system for controlling an activation threshold of a safety system of a vehicle. The vehicle control system comprises a communication interface, and a control circuit. The control circuit is configured to receive map data from a remote data repository via the communication interface, the map data comprising a geographical location of a dynamic object located in a surrounding area of an expected path of the vehicle, determine and monitor a geographical location of the vehicle by means of a localization system of the vehicle, and lower an activation threshold of the safety system when the geographical location of the vehicle is within a predefined distance from the dynamic object. With this aspect of the invention, similar advantages and preferred features are present as in the previously discussed first aspect of the invention.

Further, according to a fourth aspect of the present invention, there is provided a vehicle comprising a localization system for determining a geographical location of the vehicle, a perception system for determining, relative to the vehicle, a position of a dynamic object in a surrounding environment of the vehicle, and a vehicle control system according to any one of the embodiments discussed herein. With this aspect of the invention, similar advantages and preferred features are present as in the previously discussed first aspect of the invention.

Further, according to a fifth aspect of the present invention, there is provided vehicle management system comprising a memory comprising map data of a geographical area, a communication interface for receiving and transmitting data, and a control circuit. The control circuit is configured to receive supplementary map data, via the communication interface from a first vehicle operating in the geographical area, the supplementary map data comprising a geographical location of at least one dynamic object in the geographical area, update the map data based on the received supplementary map data, and transmit the updated map data to a second vehicle located in the geographical area. With this aspect of the invention, similar advantages and preferred features are present as in the previously discussed first aspect of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the invention will appear from the following detailed description, reference being made to the accompanying drawings, in which.

DETAILED DESCRIPTION

Figure 1:
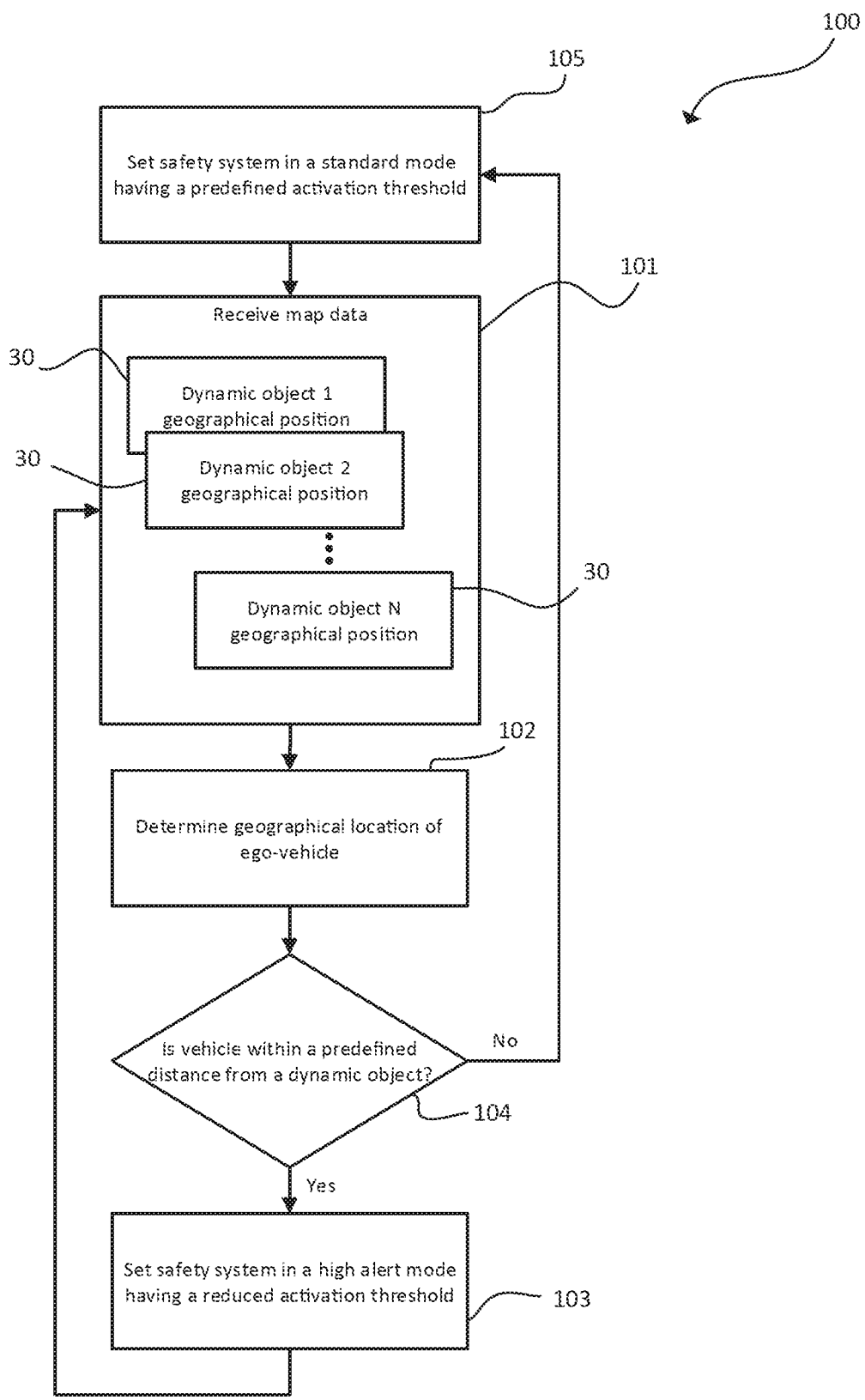
FIG. 1 is a flow chart representation of a method for controlling an activation threshold of a safety system of a vehicle in accordance with an embodiment of the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or analogous components.

Even though the following discussion is mainly focused on a vehicle safety system in the form of an Emergency Brake System (EBS) and the selection of the associated activation threshold, it is clear for the skilled reader that the present invention is analogously applicable for other vehicle safety systems, such as e.g. a vehicle steering system arranged to control the steering properties of the vehicle to provide a faster response in a critical situation.

FIG. 1 is a flow chart representation of a method 100 for controlling an activation threshold of a safety system (such as e.g. an EBS) of a vehicle. The method 100 comprises receiving 101 data from a remote data repository (e.g. remote server or another vehicle via a wireless network (e.g. cellular network, Vehicle-to-Vehicle, V2V communications). The map data comprises a geographical location (e.g. a GPS position) of one or more dynamic objects 30 located in a surrounding area of an expected path of the vehicle. A dynamic object 30 is in the present context to be construed as an object external to the vehicle which is not static (i.e. fixed in a location) but generally assumed to be moving such as e.g. pedestrians, animals, or cyclists. In some exemplary embodiments, the dynamic objects 30 do not include other common road vehicles (cars, busses, trucks). The map data accordingly comprises positional information about any potential pedestrians, animals or cyclists located along an expected path of the vehicle.

Further, the method 100 comprises determining 102 a geographical location of the vehicle by means of a localization system of the vehicle. The geographical location can be determined 102 by means of e.g. a Global Navigation Satellite System (GNSS) as like for instance Global Positioning System (GPS), Globalnaya Navigazionnaya Sputnikovaya Sistema (GLONASS), Galileo, Beidou, etc. Alternatively, or additionally, the geographical location may be determined by measuring the vehicle's specific force and angular rate (e.g. by means of an Inertial Measurement Unit) and compare with the road geometry in order to determine the geographical location of the vehicle, or by means of a landmark measurement positioning system.

Further, a check is performed to determine 104 whether or not the vehicle is within a predefined distance from the geographical location of one of the dynamic objects 30 (may be referred to as within a predefined distance from the dynamic object in the following). If or when the vehicle is within the predefined distance from the geographical location of the dynamic object 30, an activation threshold value of the system is reduced 103. Stated differently, the safety system is set 103 in a "high alert" mode when the vehicle is within a predefined distance from the geographical location of the dynamic object 30. In the "high alert" mode, the safety system is set such that it is activated more rapidly when triggered.

For example, the safety system can be an EBA system, and the step of lowering an activation threshold comprises lowering a threshold of a rapidity/speed of which an accelerator pedal of the vehicle is released. Alternatively or additionally, the step of lowering an activation threshold comprises lowering a threshold of a rapidity/speed of which a brake pedal of the vehicle is pressed.

Moving on, if it is determined 104 that the vehicle is not within the predefined distance from the dynamic object 30, the safety system is set or maintained in a standard mode having a predefined activation threshold. Thus, stated differently the step of setting 103 the safety system in an "high alert" mode may be construed as controlling an activation threshold value of the safety system from a first activation threshold value to a second activation threshold value when the geographical location of the vehicle is within a predefined distance from the object. The first activation threshold value is higher than the second threshold value such that the safety system is employed faster when the safety system has the second threshold value.

Further, in accordance with an exemplary embodiment, the method comprises raising an awareness level of the safety system. Thus, as an alternative or addition to reducing an activation threshold value of the safety system, one can for example to activate additional sensors of the safety system in order to increase an accuracy or awareness level of the safety system.

Figure 2A:
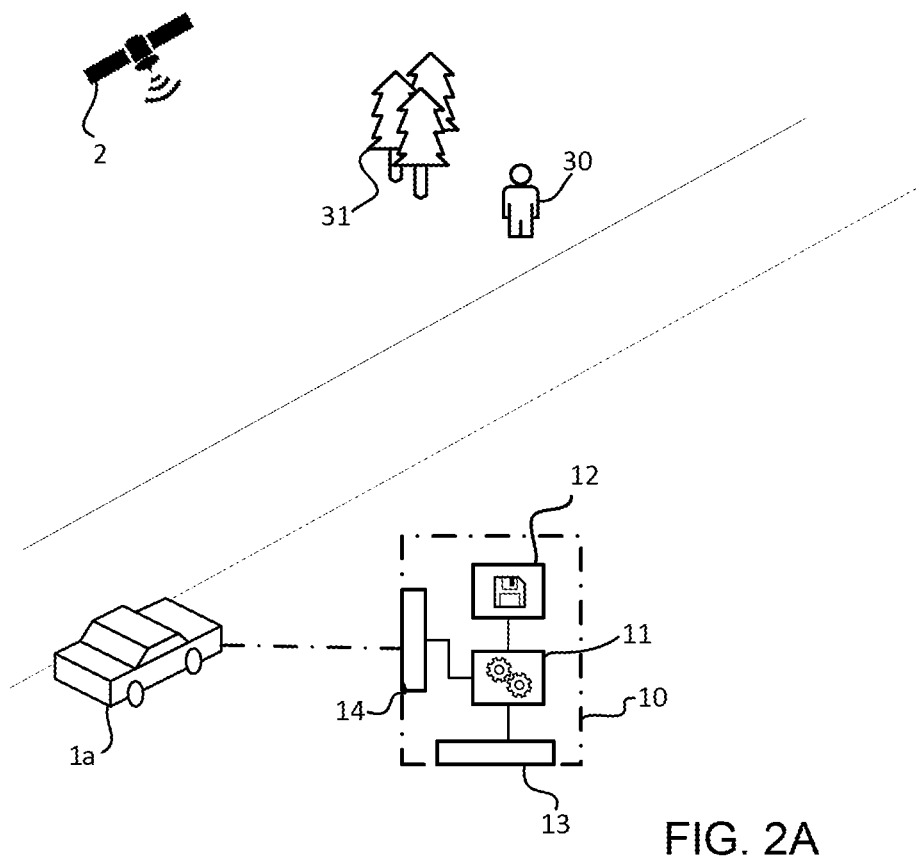
FIGS. 2a-2b are schematic perspective view illustrations of a vehicle having a vehicle control system according to an embodiment of the present invention.
Figure 2B:
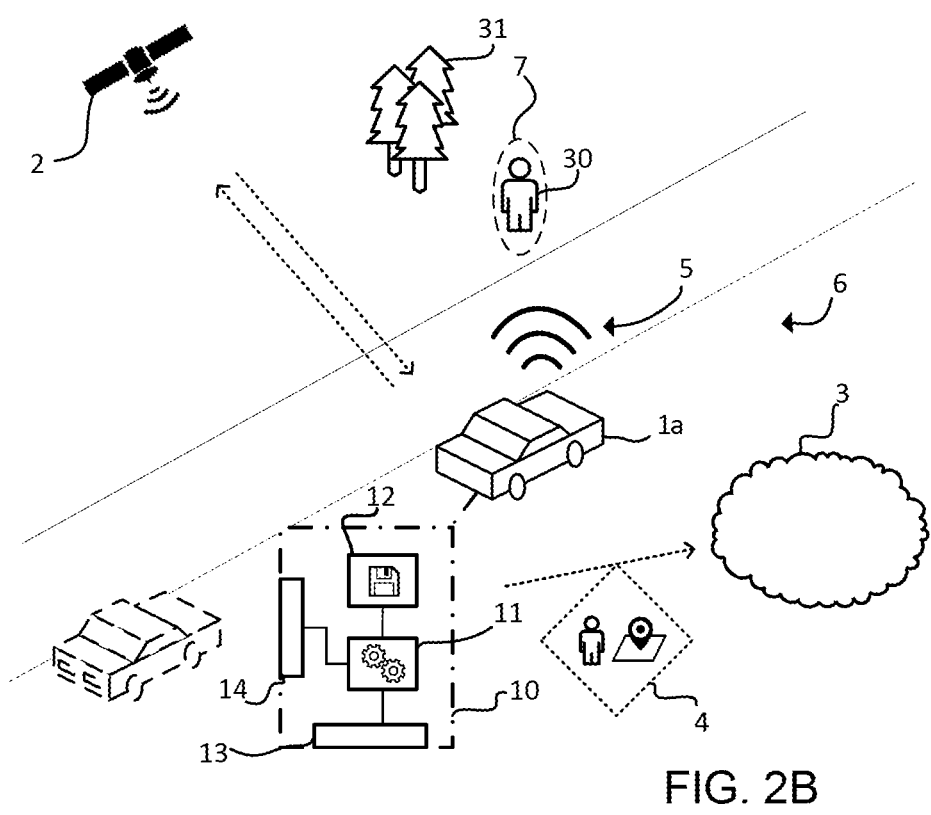

FIGS. 2a and 2b are two perspective view illustrations of a vehicle 1a comprising a vehicle control system 10 for controlling an activation threshold of a safety system of a vehicle 1a according to an exemplary embodiment of the present invention. FIG. 2a shows a vehicle 1a traveling on a rural country road towards a dynamic object 30 in the form of a pedestrian 30 standing by a tree line indicated by the static objects 31 in the form of trees. The vehicle 1a comprises a vehicle control system 10 having a communication interface 14, a sensor interface 13, a memory 12 and a control circuit (e.g. in the form of a processor or processing unit) 11. The control circuit 11 is connected to each one of the communication interface 14, sensor interface 13 and memory 12. The control circuit 11 is configured to execute instructions stored in the memory 12 to perform a method for controlling an activation threshold of a safety system of the vehicle 1a according to any one of the embodiments discussed herein.

The vehicle 1a is provided with one or more antennas (not shown) for both communication with external networks and also for receiving GPS signals (from one or more GPS satellites 2); however, separate antennas may be provided for external communication and GPS signals. In more detail, the vehicle 1a is provided with a localization system (not shown) which may include sensors receiving signals from one or several satellite based positioning systems, e.g. from GPS satellites 2.

Thus, the vehicle 1a is further connected to external network(s) via for instance a wireless link. The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, V2V, and/or vehicle to infrastructure, V2X. Examples of cellular radio technologies are GSM, GPRS, EDGE, LTE, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

As illustrated in the exemplary embodiment of FIG. 2b, the control circuit 11 is configured to receive a position, relative to the vehicle 1a, of a dynamic object 30 in a surrounding environment 6 of the vehicle 1a from a perception system of the vehicle 1a. The perception system may for example comprise one or more of a radar (Radio Detection and Ranging) arrangement, LIDAR (Light Detection and Ranging) arrangement, and one or more cameras, or any other suitable automotive grade sensor for detecting/determining 5 the position of an external object in their field of view (FOV) or viewing frustum. More specifically, the vehicle perception system furthermore comprises one or more optical cameras for assisting in identification/classification 7 of the detected object.

Further, the control circuit 11 is configured to determine a geographical location of the dynamic object 30 in the surrounding environment 6 of the vehicle 1a based on the determined position (relative to the vehicle 1a) of the dynamic object and the determined geographical location of the vehicle 1a. In more detail, by knowing the geographical location of the vehicle 1a (i.e. a position in a global coordinate system), and the position of the dynamic object in a local coordinate system of the vehicle, the control circuit 11 can be configured to derive a location of the dynamic object 30 in the global coordinate system by means of a coordinate transformation. Naturally, the associated computations may be performed locally in the vehicle control system 10 or remotely via e.g. a cloud-based solution, or a combination thereof as known in the art. Once the geographical location of the dynamic object 30 is known, the data 4 is uploaded or sent to a remote data repository 3. This may also be referred to as probe sourcing to a map.

The control circuitry 11 may comprise at least one processor with a number of modules for performing different operations, and be connected to at least one computer readable memory or storage medium 12 for storing data and/or instruction sets for operating different functions in the processor(s). Furthermore, optionally, depending on functionality provided in the control circuitry 11 one or more communication interfaces 14 and/or one or more antenna interfaces (not shown) may be provided and furthermore, one or more sensor interfaces 13 may be provided for acquiring data from sensors within the vehicle. The modules of the processor may be an acquisition module, an analysis module and an action module each arranged to execute instruction sets for different steps of a process for performing a method according to the present disclosure. It should be appreciated that the communication/antenna interface may also provide the possibility to acquire sensor data directly or via dedicated sensor control circuitry in the vehicle: for instance GPS data may be acquired through the antenna interface, some sensors in the vehicle may communicate with the control circuitry using a local network setup, such as CAN bus, I2C, Ethernet, optical fibers, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

In summary, FIGS. 2*a* and 2*b* illustrate a method comprising determining a position, relative to the vehicle 1*a*, of a dynamic object 30 in a surrounding environment of the vehicle 1*a*, determining a geographical location of the dynamic object 30 based on the determined position of the dynamic object 30 and a geographical location of the vehicle 1*a*, and transmitting wireless data packets comprising information about the geographical location 4 of the dynamic object 30 to a remote data repository 3.

Figure 3A:
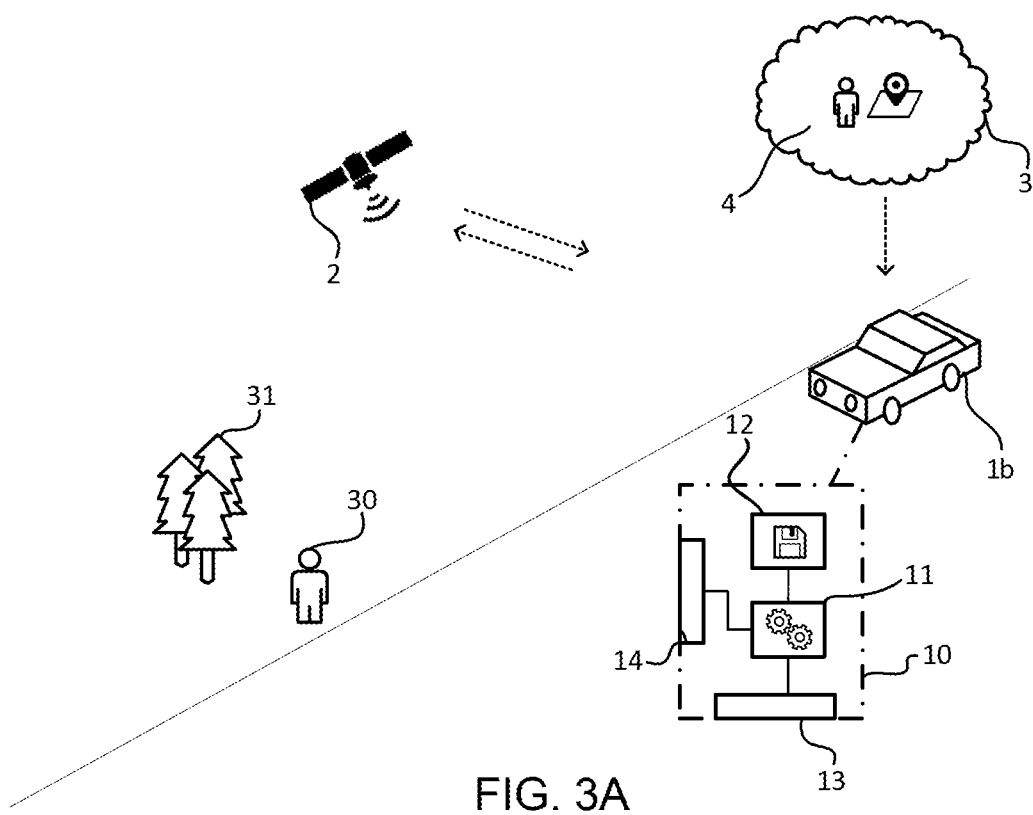
FIGS. 3a-3b are schematic perspective view illustrations of a vehicle having a vehicle control system according to another embodiment of the present invention.
Figure 3B:
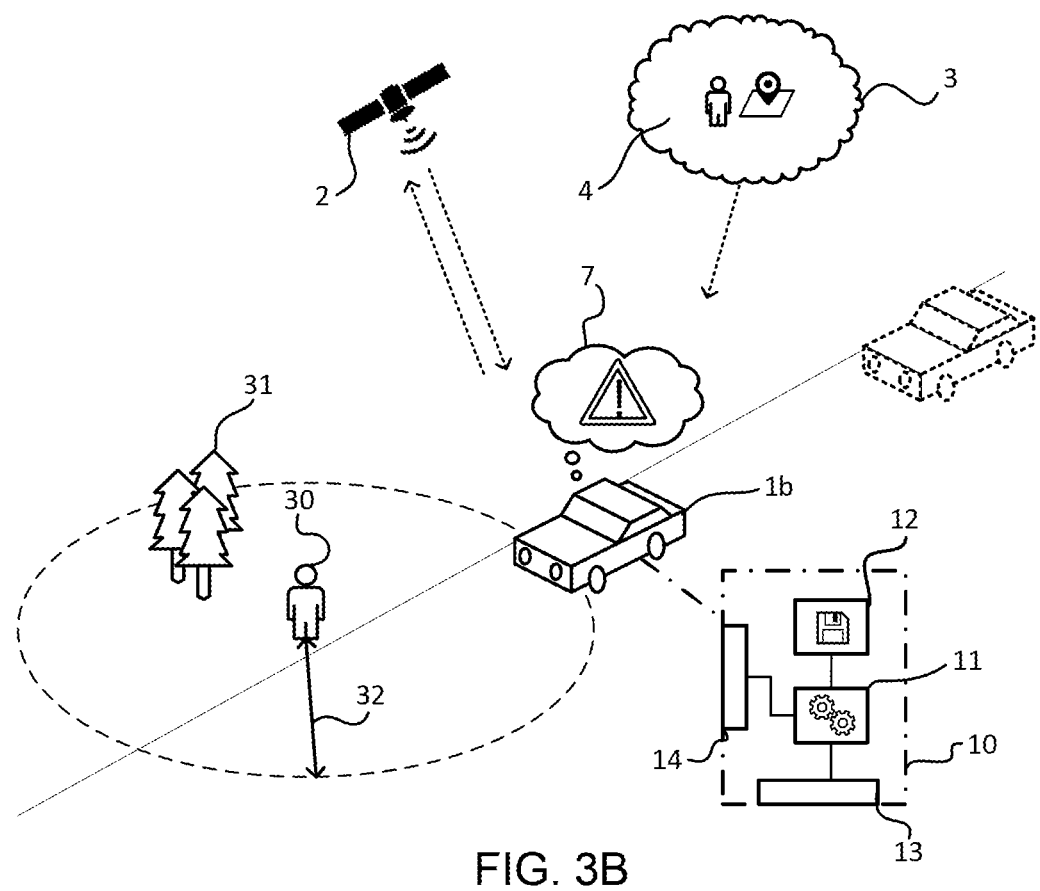

FIGS. 3*a* and 3*b* are two perspective view illustrations of a vehicle 1*a* comprising a vehicle control system 10 for controlling an activation threshold of a safety system of a vehicle 1*a* according to an exemplary embodiment of the present invention. As readily understood by the skilled reader, the vehicle 1*b* is provided with analogous hardware and features/functions as the vehicle 1*a* of the previously discussed embodiments with reference to FIGS. 2*a* and 2*b*, and will for the sake of brevity not be repeated.

Further, in FIGS. 3*a* and 3*b*, the vehicle 1*b* is approaching the previously detected dynamic object 30 on the same rural country road. Here, the control circuit 11 is configured to receive map data from a remote data repository via the communication interface 14. The map data comprises a geographical location 4 of a dynamic object 30 located in a surrounding area of an expected path of the vehicle 1*b*. Accordingly, even if the remote data repository comprises map data having information about further dynamic objects in the map, the vehicle 1*b* only receives the information about dynamic objects 30 located along its expected or predicted path. This serves the purpose of reducing data traffic to and from the vehicle as well as the needs for processing power of the control circuit 11. In other words, the vehicle control system 10 preferably only retrieves data relevant for the current session.

Moreover, the received map data and in particular the information related to the location of the dynamic object(s) 30 may be associated with a dead reckoning model such that the received geographical location(s) of the dynamic object(s) is a predicted location based on a determined location, or fix, and estimated speeds over elapsed time and course/heading of the dynamic object(s) 30. Furthermore, the received map data may also be tied to a quality threshold counter such that the information related to the location of the dynamic object(s) 30 is only received if it is not older than a predefined threshold value. This is in order to avoid unnecessary adjustments of threshold values of the safety system and potential false positives. Thus, the control circuit of the vehicle 1*b* may be configured to transmit a time stamp associated with the measurement of the position of the dynamic object 30.

Further, the control circuit 11 is configured to determine and monitor a geographical location of the vehicle 1*b* by means of a localization system of the vehicle 1*b*. As discussed in the foregoing, the localization system (not shown) may be realized in alternatives ways as readily appreciated by the skilled artisan. For example, the localization system may comprise one or more antennas in communication with one or more GPS satellites 2. Once the location of the dynamic object 30 and the geographical location of the vehicle 1*b* are known, the control circuit 10 is configured to lower/reduce an activation threshold of the safety system (e.g. EBA system) when the current geographical location of vehicle 1*b* is within a predefined distance 32 from the dynamic object 30. In other words, as indicated in FIG. 3*b*, when the vehicle 1*b* enters a radius defined by the predefined distance 32, the safety system of the vehicle 1*b* is set in a "high alert" mode (as indicated by reference numeral 7).

Figure 4:
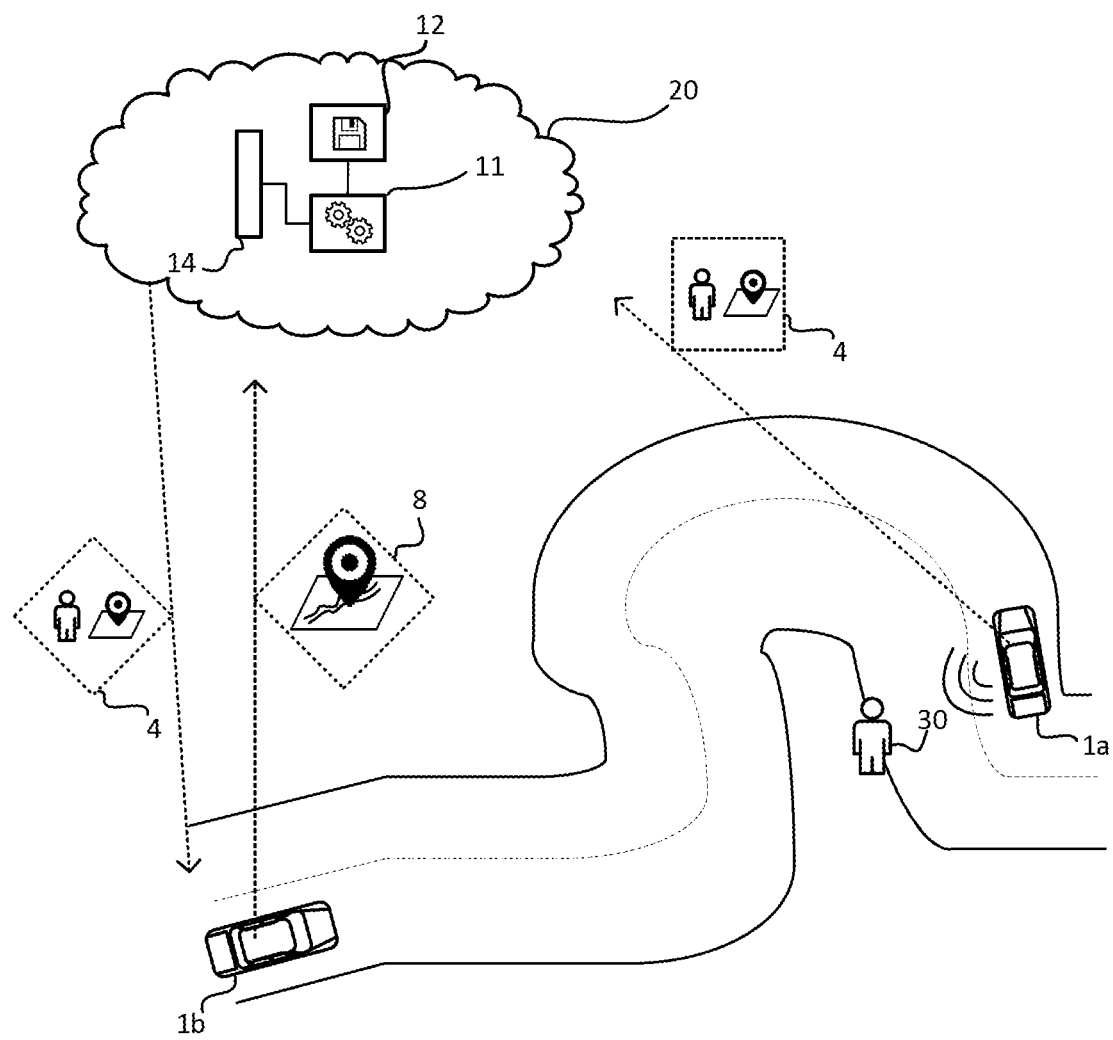
FIG. 4 is a schematic overview illustration of a vehicle management system according to an exemplary embodiment of the present invention.

FIG. 4 is a schematic overview illustration of a vehicle management system 20 comprising a memory 12 including map data of a geographical area, a communication interface 14 for receiving and transmitting data, and a control circuit 11. The control circuit 11 is configured to receive supplementary map data from a first vehicle 1*a* operating in the geographical area. The supplementary map data comprises a geographical location 4 of a dynamic object 30, here in the form of a pedestrian. Further, the control circuit 11 is configured to update the map data based on the received supplementary map data, and transmit the updated map data to a second vehicle 1*b* located in the geographical area. Moreover, the control circuit 11 may further be configured to apply a dead reckoning model on the received map data in order to determine a predicted geographical location for the dynamic object.

Furthermore, the control circuit 11 of the vehicle management system 20 is configured to receive an expected path 8 from the second vehicle 1*b*, and select a subset of the received supplementary map data (from the first vehicle 1*a*) based on the received planned path 8 and one or more selection criteria. The selection criteria may for example be to only select supplementary map data that is relevant for the second vehicle 1*b*, i.e. map data comprising information related to the planned/expected path. In more detail, a selection criteria may be to define a threshold distance from the planned/expected path, outside of which dynamic objects are disregarded. Hereby, one can reduce data traffic by avoiding transmission of superfluous data to the second vehicle 1*b*. Also, additionally or alternatively, the selection criteria may also include applying a time counter to the supplementary map data (having a time stamp as to when it was transmitted to the vehicle management system 20 from the first vehicle 1*a*) such that outdated data is not transmitted to the second vehicle 1*b*.

Moreover, the planned/expected path may for example be received from a navigation system of the second vehicle 1*b* (e.g. a GPS navigation system comprising a route to a user-provided destination). The expected path may also be received from a route optimization module of the second vehicle 1*b*.

In summary, the present disclosure provides for a means for increasing the general road safety by utilizing dynamic map data as an input source for preparing various safety systems of vehicles. The dynamic map data comprises periodic updates from vehicles connected to a common vehicle management system, where the updates are based on sensory information of the vehicles in order to identify the positions of e.g. pedestrians, cyclists, animals or other objects with which a vehicle may collide with. The proposed method and systems are particularly suitable for road vehicles driving on small winding cross country roads in less than ideal conditions (e.g. dark, windy, rainy, and/or snowy) where there is a risk that the vehicle may collide with a pedestrian walking alongside the road due to poor visibility and late reactions.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

The processor(s) or control circuit(s) (associated with the vehicle control system and vehicle management system) may be or include any number of hardware components for conducting data or signal processing or for executing computer code stored in memory. The control circuit may for example be a microprocessor, digital signal processor, graphical processing unit (GPU), embedded processor, field programmable gate array (FPGA), or ASIC (Application specific integrated circuit).

As discussed in the foregoing the systems have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes/methods described herein.

The different features and steps of the embodiments may be combined in other combinations than those described. Even though the foregoing description has mainly been made in reference to vehicles in the form of cars, the invention is also applicable in other road vehicles such as busses, trucks, motorcycles, etc.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for controlling an activation threshold of a safety system of a vehicle, said method comprising:
   receiving map data from a remote data repository, said map data comprising a geographical location of a dynamic object located in a surrounding environment of an expected path of the vehicle;
   determining a geographical location of the vehicle by means of a localization system of the vehicle; and
   lowering an activation threshold value of the safety system when the geographical location of the vehicle is within a predefined distance from the dynamic object.

2. The method according to claim 1, wherein the dynamic object is a first dynamic object, the method further comprising:
   determining a position, relative to the vehicle, of a second dynamic object in a surrounding environment of the vehicle;
   determining a geographical location of the second dynamic object in the surrounding environment of the vehicle based on the determined position of the second dynamic object and the determined geographical location of the vehicle; and
   transmitting wireless data packets comprising information about the geographical location of the second dynamic object to the remote data repository.

3. The method according to claim 2, further comprising:
   raising the activation threshold of the safety system when the geographical location of the vehicle changes from being within the predefined distance to being outside of the predefined distance from the first dynamic object.

4. The method according to claim 3, further comprising:
   generating an output to a user of the vehicle when the geographical location of the vehicle is within the predefined distance from the first dynamic object, said output comprising information about the geographical location of the dynamic object.

5. The method according to claim 1, wherein the safety system is an Emergency Brake Assist, EBA, system, and the step of lowering an activation threshold comprises lowering a threshold of a speed of which an accelerator pedal of the vehicle is released.

6. The method according to claim 1, wherein the safety system is an Emergency Brake Assist, EBA, system, and the step of lowering an activation threshold comprises lowering a threshold of a speed of which a brake pedal of the vehicle is pressed.

7. The method according to claim 1, wherein the step of receiving map data from a remote data repository comprises receiving map data only comprising geographical location of any dynamic object located in a surrounding area of an expected path of the vehicle.

8. A vehicle control system for controlling an activation threshold of a safety system of a vehicle, the vehicle control system comprising:
   a communication interface;
   a control circuit configured to:
      receive map data from a remote data repository via the communication interface, the map data comprising a geographical location of a dynamic object located in a surrounding area of an expected path of the vehicle;

determine and monitor a geographical location of the vehicle by means of a localization system of the vehicle; and lower an activation threshold of the safety system when the geographical location of the vehicle is within a predefined distance from the dynamic object.

9. The vehicle control system according to claim 8, wherein the dynamic object is a first dynamic object, and wherein the vehicle control system further comprises a sensor interface for receiving data from a perception system of the vehicle, and wherein the control circuit is further configured to:

receive a position, relative to the vehicle, of a second dynamic object in a surrounding environment of the vehicle from the perception system of the vehicle;

determine a geographical location of the second dynamic object in the surrounding environment of the vehicle based on the determined position of the second dynamic object and the determined geographical location of the vehicle; and uploading the geographical location of the second dynamic object to the remote data repository.

10. A vehicle management system comprising:

a memory comprising map data of a geographical area;

a communication interface for receiving and transmitting data;

a control circuit configured to:

receive supplementary map data, via the communication interface from a first vehicle operating in the geographical area, the supplementary map data comprising a geographical location of at least one dynamic object in the geographical area; and update the map data based on the received supplementary map data; transmit the updated map data to a second vehicle located in the geographical area.

11. The vehicle management system according to claim 10, wherein the control circuit is further configured to:

receive an expected path from the second vehicle; and select a subset of the received supplementary data based on the received planned path and at least one selection criteria, wherein the transmitted updated map data only comprises the selected subset of received supplementary map data.

* * * * *